United States Patent [19]

Svensson

[11] Patent Number: 4,999,746
[45] Date of Patent: Mar. 12, 1991

[54] SUNVISOR FOR MOTOR VEHICLES

[75] Inventor: E. Gunnar Svensson, Malung, Sweden

[73] Assignee: Autopart Sweden AB, Malung, Sweden

[21] Appl. No.: 341,964

[22] Filed: Apr. 24, 1989

[30] Foreign Application Priority Data

Apr. 29, 1988 [SE] Sweden .................................. 8801632

[51] Int. Cl.$^5$ ............................................... B60Q 3/00
[52] U.S. Cl. ..................................... 362/74; 362/83.1; 362/144; 296/97.2
[58] Field of Search .................. 362/61, 80, 74, 142, 362/144, 135, 83.1, 83.3; 296/97, 97.2, 97.3, 97.5

[56] References Cited

U.S. PATENT DOCUMENTS

| 3,375,364 | 3/1968 | Marcus | 362/61 |
| 4,174,864 | 11/1979 | Viertal et al. | 296/97.5 |
| 4,486,819 | 12/1984 | Marcus et al. | 362/80 |
| 4,511,954 | 4/1985 | Marcus et al. | 362/144 |
| 4,541,663 | 9/1985 | Schwanitz et al. | 362/144 |
| 4,591,956 | 5/1986 | Majchrzak | 362/135 |
| 4,760,503 | 7/1988 | Vandenberge et al. | 362/80 |
| 4,807,093 | 2/1989 | Cisler | 362/74 |
| 4,809,140 | 2/1989 | Jonsas | 362/74 |

Primary Examiner—Stephen F. Husar
Assistant Examiner—D. M. Cox
Attorney, Agent, or Firm—Young & Thompson

[57] ABSTRACT

Sun visor for vehicles with a lighting unit (4), which is flush-mounted in the sun visor (1) on one longitudinal side (2). The lighting unit is symmetrical relative to the central plane of the sun visor in order to direct light in both directions from the plate.

6 Claims, 2 Drawing Sheets

SUNVISOR FOR MOTOR VEHICLES

The present invention relates to a sun visor for motor vehicles, comprising an oblong plate which is hinged to the vehicle at one of the longitudinal sides of the plate, and a lighting unit carried by the plate, which lighting unit is disposed when the plate is folded down in an essentially vertical position, to spread light at least backwards from the plate.

Previously known sun visors with lighting usually have the lighting arranged in combination with a mirror centrally on the side of the visor which is normally folded up towards the ceiling and the lighting has the main purpose of directing light towards a person looking in the mirror on the sun visor. In some cases, the mirror and lighting unit are coordinated with a cover in such a way that the lighting unit in a certain position of the sun visor and with the cover as a shield can be used for map reading, for example. In its normal position with the sun visor folded up towards the ceiling, the lighting on the sun visor has, however, no purpose to fulfill. Rather, other lighting means are used for the other illumination purposes, such as a lighting unit placed centrally on the ceiling, special reading lamps etcetera.

The purpose of the present invention is to provide a sun visor of the type described in the introduction, in which the lighting unit can be used both to illuminate the person looking in the mirror mounted on the sun visor when the sun visor is folded down in the vertical position, and for other lighting purposes, for example as a general illumination to replace ordinary ceiling lights, when the sun visor is folded up against the ceiling.

This is achieved according to the invention by virtue of the fact that the plate carries on said one longitudinal side a lighting unit, which is shaped and disposed so that in the vertical position of the plate it also spreads light forward from the plate.

In such an arrangement, the lighting in the normal position of the sun visor folded up against the ceiling, it blocks a portion of the rearwardly directed light, but permits spreading of light downwards. The lighting can be disposed in the visor in such a manner that it provides practically the same spreading of light as, and therefore can replace, known types of conventional ceiling lights, which are often placed at the upper edge of the windshield above the vehicle rearview mirror.

The invention will be described in more detail with reference to examples shown in the accompanying drawings, where FIG. 1 shows a plan view of a first embodiment of a sun visor, FIG. 2 shows a section along the line A—A in FIG. 1, FIG. 3 shows a plan view of a second embodiment.

Figure 1:
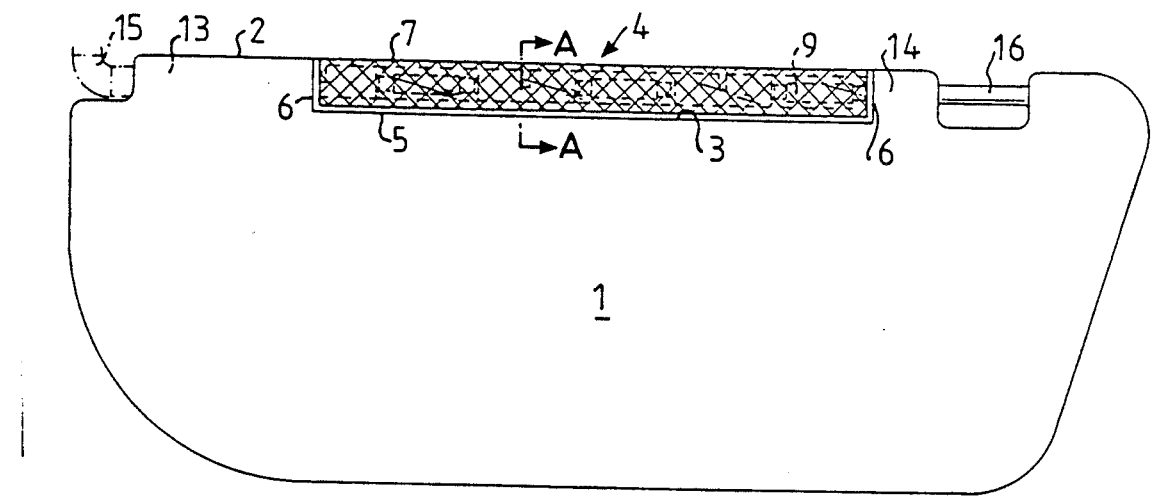
Figure 2:
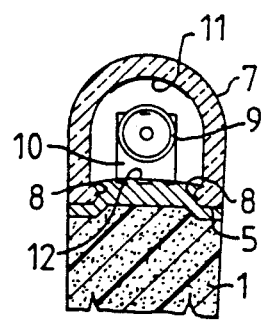

The sun visor itself in FIG. 1 consists of a plate 1 moulded in one piece of, for example, foamed plastic with an embedded reinforcing metal wire frame (not shown). The plate 1 has on its one longitudinal side 2 a cavity or depression 3, the shape and size of which are adapted to a wand-shaped lighting unit, generally designated 4, so that the unit fills the cavity 3 completely and forms a portion of the sun visor as can be seen in FIG. 1. The lighting unit has a flat bottom plate 5, with end pieces 6, which in the embodiment shown in FIGS. 1 and 2 can be glued directly to the foam plastic material in the bottom and sides of the cavity 3. A U-shaped "lamp glass" (see FIG. 2) extends between the end pieces 6 and has hook-shaped portions 8 snapped into the bottom plate. The lamp glass can consist of transparent plastic material which covers the lamps 9 or flourescent tubes, which are held in lamp holders 10 fixed to the bottom plate. the U-profile 7 is, in the embodiment showed in FIGS. 1 and 2, transparent in its entirety and reflecting strips 11 and 12 are fixed to its inside and to the bottom plate 5, respectively, so that the light is reflected substantially forwards and backwards when the sun visor is in its vertical position. The lamp glass 7 has the same U-profile as the portions 13 and 14 of the plate on either side of the end pieces 6, so that a smooth and aesthetically appealing transition is provided.

The embodiment according to FIG. 1 can be conventional as regards the construction of the plate, which constitutes the sun visor itself; i.e. in the portions 13 and 14 of the plate there is a bearing for a main shaft 15 and a shaft holder for a second shaft 16 embedded in the foamed plastic material.

Figure 3:
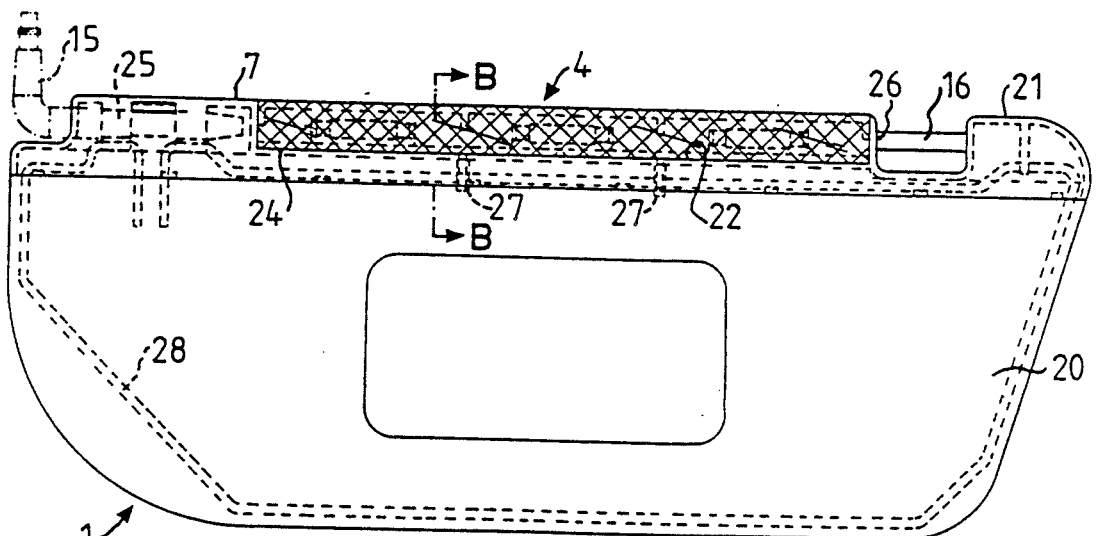
Figure 4:
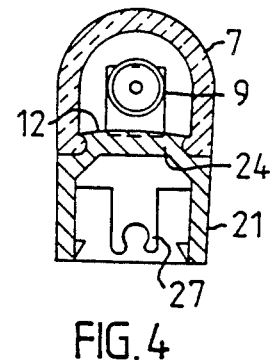
FIG. 4 shows a section along the line B—B in FIG. 3.

The embodiment in FIGS. 3 and 4 distinguishes from the embodiment described above in that the plate 1 consists of a soft portion 20, e.g. of foamed plastic, and a rigid portion 21 of moulded hard plastic, for example. In the rigid portion 20 there is a cavity 22, corresponding to the cavity 3 above the lighting unit 4, which agrees with that described above with the difference that the bottom plate 24 is here made in one piece with the rigid plastic body 21 as well as a main bearing 25 for the main shaft 15 and a shaft holder 26 for the second shaft 16. Clip-like projections 27 on the bottom plate 24 engages the reinforcing wire frame 28 in the plate 20 and hold the plate 20 together with the rigid body 21.

Figure 5:
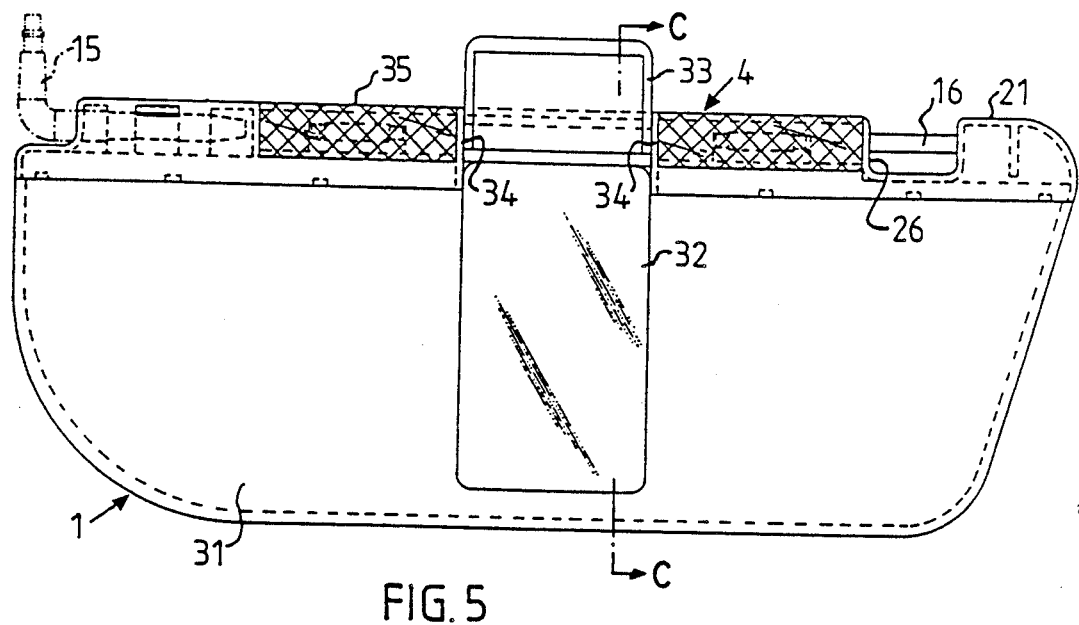
FIG. 5 shows a plan view of a third embodiment.
Figure 6:
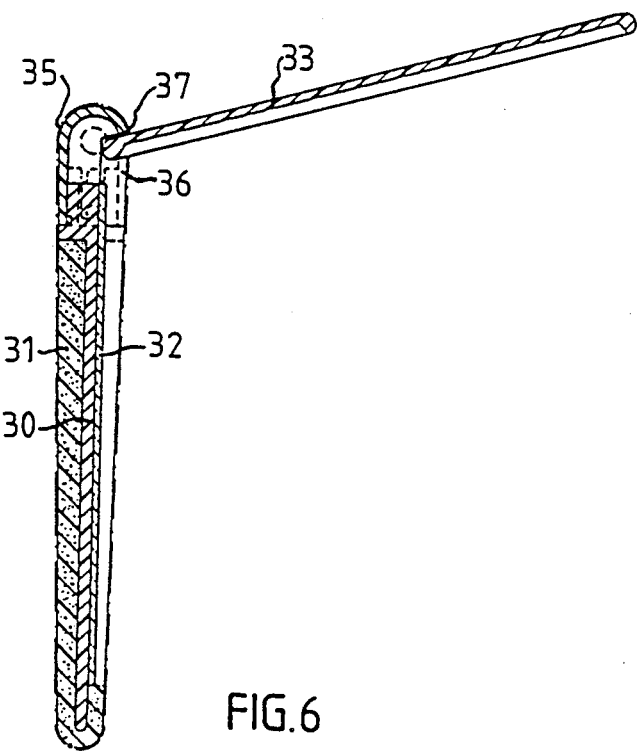
FIG. 6 shows a section along the line C—C in FIG. 5.

FIGS. 5 and 6 show an embodiment in which the plate 1 is constructed with a central rigid plate 30 with a layer of softer material 31 on either side. On the side of the plate 30 which is rearwardly directed in the folded-down position of the sun visor, the plate 30 has no layer 31 in its central portion and a mirror 32 is glued there. A cover 33 is hinged to the lighting unit 4 and is provided in a known manner with an "over-center" spring mechanism which biases the cover 33 to a position covering the mirror and to a folded-up position (see FIG. 6). The cover is hinged in a pair of opposing wall portions 34 in the lighting unit 4 and the "lamp glass" 35 differs from those described above in that it has an opening 36 for the cover 33 between the walls 34. The upper edge 37 of the opening 36 serves as an abutment surface for the cover in its folded-up position.

In all of the embodiments described, the lighting 4 can with advantage be electrically connected via common door switches, which complete the circuit so that the lighting is lit when the doors are opened. Beyond this, manual switches are also required so that the lighting can be turned on and off independently of the door switches. In the embodiment in FIGS. 5 and 6, a switch (not shown) can be operated in a known manner by the cover 33, so that the lighting is turned on when the cover is fold up to the position shown.

What is claimed:

1. Sun visor for motor vehicles, comprising an oblong plate, in which one of the longitudinal sides of the plate comprises means for hingedly mounting the oblong plate to the vehicle, and a lighting unit carried by the plate, which lighting unit is disposed, when the plate is folded down to an essentially vertical position, to spread light at least backwards from the plate, characterized in that the plate (1) carries on said one longitudinal side (2) a lighting unit (4), which is shaped and disposed so that in the vertical position of the plate, it also spreads light forward from the plate, said lighting unit (4) extending over a substantial portion of the length of the plate (1) and having a thickness essentially equal to the thickness of the plate at the transition to the plate, so that the plate and the lighting unit form an integrated unit as regards shape, said lighting unit comprising a transparent hood and hood support means, said support means being attached to the plate and having snap fit means cooperating with complementary snap fit means on the hood so as to removably attach the hood to the support means.

2. Sun visor according to claim 1, characterized in that the plate (1) is made with an elongated depression (3; 22) or cavity in said one longitudinal side and that a lighting unit (4) adapted to the cavity is flush-mounted in the cavity and forms a smooth transition to the plate.

3. Sun visor according to claim 2, wherein said transparent hood (7; 35) is symmetrical in relation to the central plane of the plate, said hood permitting uniform spreading of light from light sources (9) inside the hood outwards from both sides of the plate.

4. Sun visor according to claim 3, characterized in that the transparent hood (7; 35) has a u-shaped cross-section.

5. Sun visor according to claim 1, characterized in that the plate (1) comprises an oblong rigid portion (21), which extends over at least essentially the entire length of said one longitudinal side (2) and carries the lighting unit (4) and portions of the plate bearing (25, 26).

6. Sun visor according to claim 1, characterized in that a cover (33) for a mirror (32) is hinged to the lighting unit (4).

* * * * *